United States Patent [19]

Zeadman et al.

[11] Patent Number: 4,614,328

[45] Date of Patent: Sep. 30, 1986

[54] RECIPROCATABLE-PLUNGER TYPE CONTROL VALVE

[75] Inventors: Zvi Zeadman; Carol Goldenberg; Zvi Grinboum, all of Kfar-Saba, Israel

[73] Assignee: M.A.L. Industrial Automation Systems Ltd., Kfar Sava, Israel

[21] Appl. No.: 670,467

[22] Filed: Nov. 13, 1984

[30] Foreign Application Priority Data

Nov. 11, 1983 [IL] Israel .................................. 70201

[51] Int. Cl.$^4$ ..................... F16K 31/06; F16K 7/12
[52] U.S. Cl. ..................... 251/129.17; 251/129.18; 251/331
[58] Field of Search ............. 251/331, 129.18, 129.17, 251/129.15, 77

[56] References Cited

U.S. PATENT DOCUMENTS

| | | | |
|---|---|---|---|
| 2,619,986 | 12/1952 | Goepfrich | 251/129.17 |
| 2,828,937 | 4/1958 | Kreitchman | 251/129.18 |
| 2,842,400 | 7/1958 | Booth et al. | 251/331 X |
| 3,014,508 | 12/1961 | Monk et al. | 251/331 X |
| 3,429,552 | 2/1969 | Huley et al. | 251/331 X |
| 4,221,361 | 9/1980 | Weingarten | 251/331 |
| 4,245,815 | 1/1981 | Willis | 251/129 |

FOREIGN PATENT DOCUMENTS

| | | | |
|---|---|---|---|
| 853469 | 11/1960 | United Kingdom | 251/331 |
| 993971 | 6/1965 | United Kingdom | 251/331 |

*Primary Examiner*—Arnold Rosenthal
*Attorney, Agent, or Firm*—Benjamin J. Barish

[57] ABSTRACT

A control valve comprises a valve assembly disposed within a housing and including a valve member movable to open and closed positions with respect to a passageway between the housing inlet and outlet. The valve assembly further includes a plunger reciprocatable within a chamber to an extended position causing the valve member to close the passageway, or to a retracted position permitting the valve member to open the passageway. The control valve further includes a presettable limit member presettable within the chamber to be engaged by the plunger to fix its retracted position, and thereby to preset the magnitude of reciprocatory movement of the plunger and the cross-sectional area of the passageway when the valve member is in its open position.

20 Claims, 3 Drawing Figures

RECIPROCATABLE-PLUNGER TYPE CONTROL VALVE

BACKGROUND OF THE INVENTION

The present invention relates to a control valve for controlling the flow of a fluid. The invention is particularly applicable to solenoid-actuated control valves of the diaphragm type, and is therefore described below with respect to such valves, but it will be appreciated that the invention could advantageously be used in other types of control valves as well.

Many types of control valves are known including a valve member (e.g., a diaphragm in a diaphragm-valve) which is movable to open and closed positions with respect to a passageway between an inlet port and an outlet port of the valve. One type includes a plunger reciprocatable within a chamber to an extended position causing the valve member (diaphragm) to close the passageway, or to a retracted position permitting the valve member to open the passageway. Such valves, however, are not entirely satisfactory for a number of applications. For example, in applications requiring relatively high-frequency operation (e.g., in the order of 15-80 actuations per second), such high-speed operation is usually not attainable with the known diaphragm valves of this type because of the magnitude of the plunger reciprocatory movement required during each valve operation. Another disadvantage of the known diaphragm valves of this type is that the fluid flow through the valve in its open condition is usually prefixed by the smallest cross-sectional area in the fluid path when the valve member is in its open position, which means that many different valve sizes are required for different applications involving different flow rates, thereby increasing the manufacturing costs and the inventory requirements for such valves.

An object of the present invention is to provide a control valve having advantages in the above respects.

According to a broad aspect of the present invention, there is provided a control valve for controlling the flow of a fluid, comprising a housing having an inlet port, an outlet port, and a passageway therebetween; and a valve assembly disposed within the housing and including a valve member movable to open and closed positions with respect to the passageway. The valve assembly further includes a plunger reciprocatable within the housing to an extended position wherein one end of the plunger engages the diaphragm causing the diaphragm to close the passageway, or to a retracted position permitting the diaphragm to open the passageway. The control valve further includes a coiled spring enclosing the plunger and having one end secured to the plunger, and the opposite end secured to the housing for urging the plunger to one of the positions; and an actuator for actuating the plunger to the other of said positions; and a presettable limit member presettable within the chamber to be engaged by the end of the plunger opposite to that engageable with the valve member to fix the retracted position of the plunger, and thereby to preset the magnitude of reciprocatory movement of the plunger and the cross-sectional area of the passageway when the plunger is in its open position.

As indicated above, the invention is particularly useful with respect to diaphragm-type control valves, wherein the valve member is a diaghragm.

Control valves, particularly of the diaphragm type, constructed in accordance with the above features provide a number of important advantages over the presently known diaphragm-type control valves: One important advantage is that by presetting the limit member, the magnitude of the reciprocatory movement of the plunger can be pre-fixed, e.g., shortened in order to increase the speed of operation of the control valve; thus, diaphragm-type control valves of known construction operating at a maximum speed of 12 operations per second have been modified in accordance with the foregoing features to increase their speed to about 80 operations per second. Another advantage in the foregoing construction is that by presetting the position of the limit member, the position of the plunger in its retracted condition can be preset to fix the cross-sectional area of the passageway between the inlet and outlet ports; thus, control valves may be supplied according to a standard construction and then adjusted, by presetting the limit member, to adapt it to the various applications requiring different flow rates.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
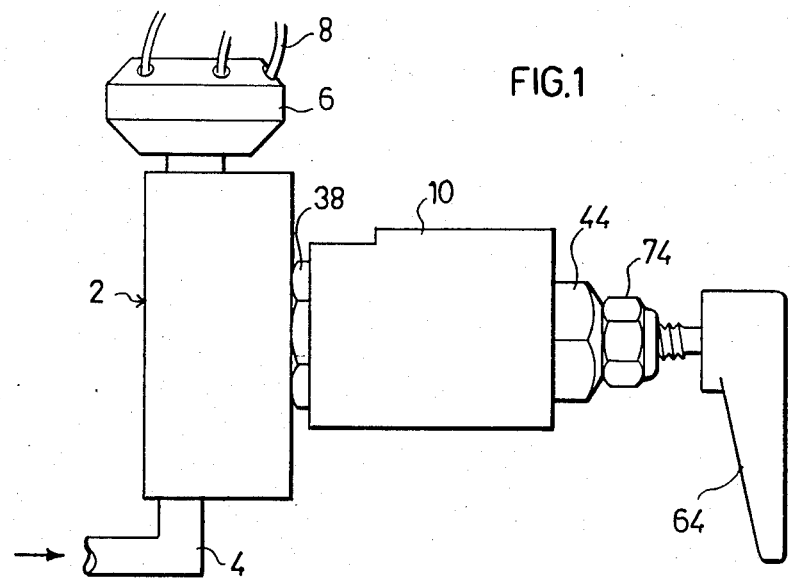
FIG. 1 is a side-elevational view illustrating one form of control valve constructed in accordance with the present invention.

The control valve illustrated in the drawings is of the solenoid-actuated type including a diaphragm valve member. The latter is disposed within a housing, generally designated 2, to be connected to a source of pressurized fluid, e.g. air, via an inlet fitting 4 for controlling the outlet of the fluid to a distributor 6 which distributes the fluid to a plurality of output tubes 8. One application of such a control valve is for controlling the operation of a punching machine wherein, during the operation the machine, pressurized-air pulses are applied via the outlet tubes 8 to various parts of the machine under the control of the solenoid 10 which actuates the control valve supplying the air pulses to the distributor 8. The present invention is primarily concerned with the structure of the control valve and the manner of actuating it by the solenoid 10, and therefore the remainder of the description will be restricted to this portion of the illustrated device.

Housing 2 is made of a solid block of metal formed with a bore 12 passing partly through it and enlarged at its inner end 14 for the reception of a diaphragm 16. Housing wall 18, opposite to that having the bore 12, is formed with another bore 20 serving as the inlet port to be connected to the inlet fitting 4, and a further bore 22 serving as the outlet port to be connected to the distributor 6. The middle portion of diaphragm 16 is displaceable, as will be described below, either away from wall 18 to open a passageway between the inlet port 20 and the outlet port 22, or firmly against wall 18 to close this passageway.

Figure 2:
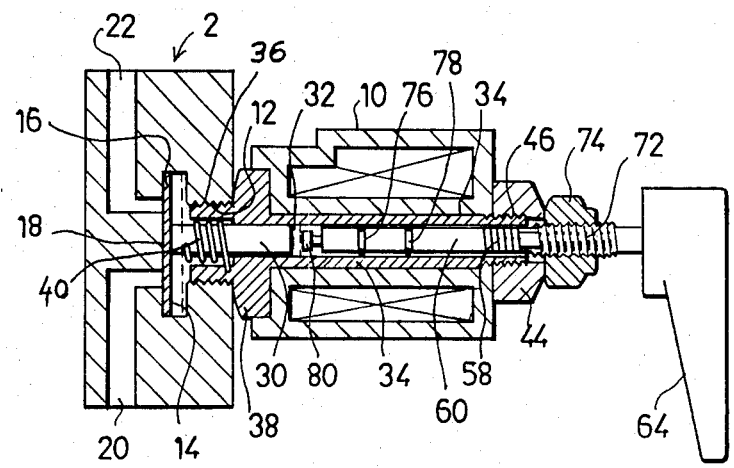
FIG. 2 is a longitudinal sectional view of the control valve of FIG. 1.

The control valve further includes a plunger 30 reciprocatable within a chamber 32 defined by bore 12 and a tubular plunger housing 34 secured to housing 2 in communication with bore 12. Plunger 30 is movable within chamber 32 either to an extended position, in firm engagement with diaphragm 16 thereby causing it to close the passageway between the two bores 20 and 22, or to a retracted position away from the diaphragm thereby permitting it to open this passageway between the inlet and outlet bores. Plunger housing 34 is secured by threads 36 (FIG. 2) formed at its end receivable within the threaded end of bore 12, and a nut 38 fixed to the plunger housing to facilitate its rotation when attaching it to the main housing 2.

Plunger 30 is biased to its extended position causing diaphragm 16 to close the passageway between the inlet and outlet ports 20, 22, by means of a coil spring 40 having one end fixed to plunger 30 and the opposite end fixed to its housing 34. Solenoid 10 encloses plunger 30 such that when the solenoid is actuated, the plunger is moved to its retracted position, thereby permitting diaphragm 16 to be displaced, by the pressurized air applied to inlet port 20, to open the passage for the flow of the air to the outlet port 22.

Figure 3:
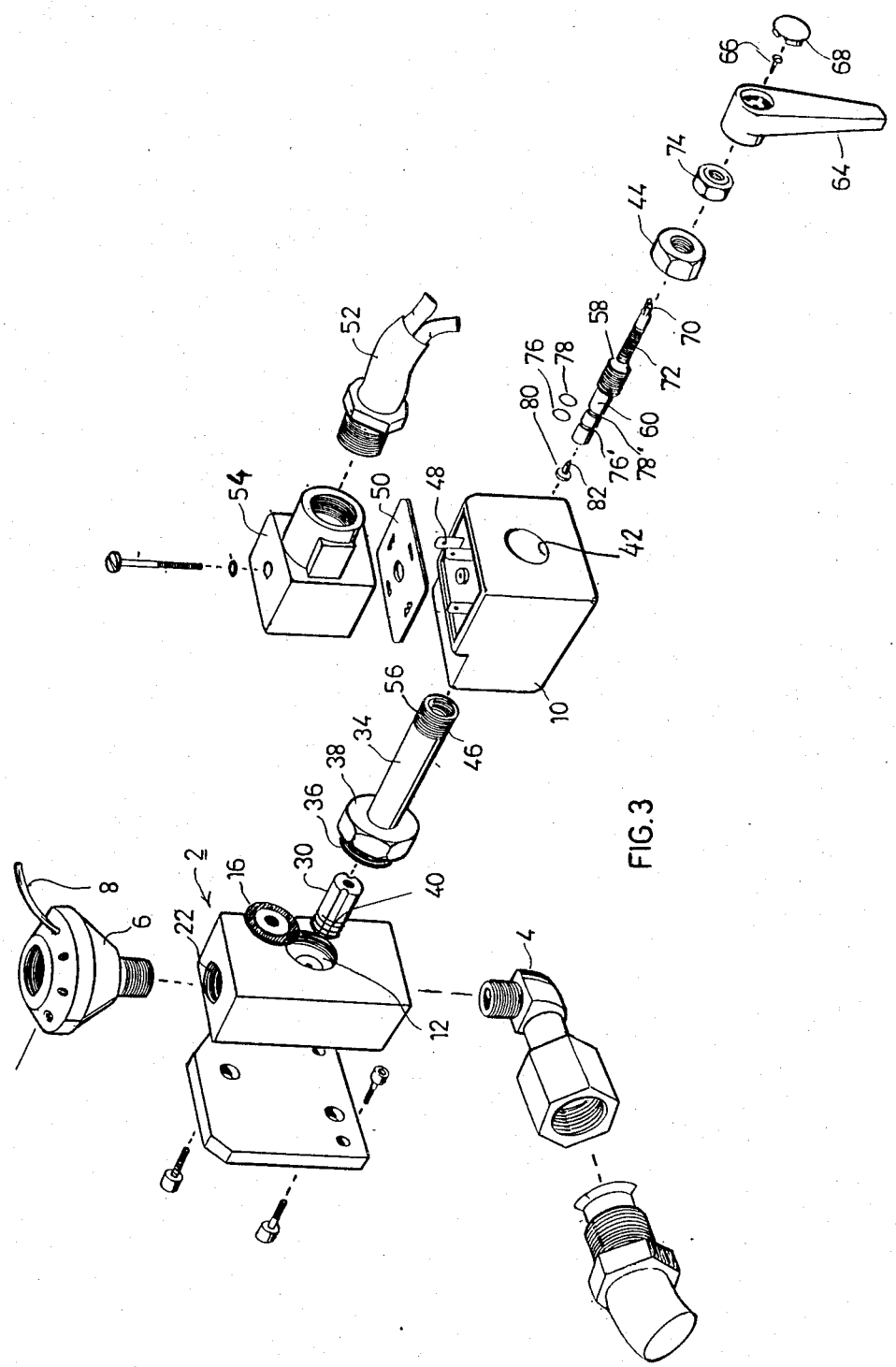
FIG. 3 is an exploded view illustrating the parts in the control valve of FIGS. 1 and 2.

Solenoid 10 is formed with a bore 42 (FIG. 3) receiving the plunger housing 34 and is secured thereto by a nut 44 threaded onto the threaded end 46 of the plunger housing. The solenoid is provided with a plurality of terminals 48 projecting through a cover plate 50 for connection to the electrical conductors 52 actuating the solenoid, which electrical conductors pass through a fitting 54 secured to the solenoid.

The outer end of plunger housing 34 is also formed with internal threads 56 receiving an enlarged, externally-threaded portion 58 of a rod 60 passed through the plunger housing 34. The inner end of rod 60 is disposed within chamber 32 so as to be engageable by the end of the plunger 30. The outer end of rod 60 extends externally of the plunger housing 34 and is attached to an external handle 64 by means of a screw 66, the latter being covered by a removable cover plate 68. The external end of rod 60 secured to handle 64 is formed with a rib or key 70, received within a complementary socket in the handle 64 such that rotation of the handle will also rotate rod 60.

Rod 60 is further formed with a threaded portion 72 adapted to receive a locking nut 74. A pair of sealing rings 76, 78 are received in annular recesses 76', 78', respectively, in the inner end of the rod to seal chamber 32 from the atmosphere. In diaphragm control valves of the foregoing type, the diaphragm 16 is usually provided with one or more small openings therethrough so as to equalize the pressure on the opposite sides of the diaphragm. Accordingly, the sealing rings 76, 78 assure that in such valves, the pressure within the valve housing 2 will not escape to the atmosphere through the plunger housing 34.

The inner end of rod 60 carries a limit member or disc 80 engageable with plunger 30 for limiting the magnitude of its movements during its reciprocations within chamber 32. Plunger 30 is of metal, and to avoid a metal-to-metal contact, limit disc 80 is preferably of hard plastic material. It is removably attached to the end of rod 60 by means of a conical stem 82 frictionally fitted into a complementary socket formed in the end of the rod.

The illustrated control valve may be used in the following manner:

First, the valve is assembled by inserting diaphragm 16 into the annular recess 14 of housing 2; attaching plunger housing 34, with the plunger 30 within it, to valve housing 2 by threading end 36 of plunger housing within the threaded end of bore 12; passing the solenoid 10 through plunger housing 34 and attaching the solenoid housing thereto by means of nut 44 applied to threads 46; and then attaching the handle 64 to the keyed end 70 of rod 60. When the control valve is so assembled, it will be seen that the limit disc 80 at the inner end of rod 60 is disposed within chamber 32 in alignment with the outer end of plunger 30. The position of this limit disc 80 may be adjusted towards or away from plunger 40 by rotating handle 64, this causing threaded section 58 of the rod to move in threads 56 of the plunger housing 34. When the limit disc 80 has been located at the desired preselected position in chamber 32, rod 60 may be locked in this position by threading nut 74 along threads 72 until it engages nut 44 locking the solenoid 10 to the plunger housing 34.

It will thus be seen that the reciprocatory stroke of the plunger can be conveniently preset either for purposes of increasing the speed of operation of the control valve by reducing the magnitude of the plunger stroke, and/or for purposes of changing the cross-sectional area of the passageway between the inlet and outlet ports, this passageway being defined by the diaphragm in the retracted position of the plunger.

It will be appreciated that many variations and modifications of the above-described embodiment could be made. For example, the displaceable valve member, instead of being a diaphragm, could be a piston moving in a cylinder. In addition, instead of using a solenoid actuator, there could be used a hydraulic or pneumatic-type actuator.

Many other variations, modifications, and applications of the invention will be apparent.

What is claimed is:

1. A control valve for controlling the flow of a fluid, comprising: a housing having an inlet port, an outlet port, and a passageway therebetween; and a valve assembly disposed within said housing and including a valve member movable to open and closed positions with respect to said passageway; said valve assembly further including a plunger reciprocatable within said housing to an extended position wherein one end of the plunger engages said valve member causing said valve member to close said passageway, or to a retracted position permitting said valve member to open said passageway; a coiled spring enclosing said plunger, and having one end secured to said plunger and the opposite end secured to said housing for urging said plunger to one of said positions; and actuator for actuating said plunger to the other of said positions; and a presettable plastic limit member presettable within said housing to be engaged by the end of the plunger opposite to that engageable with the valve member to fix the retracted position of the plunger, and thereby to preset the magnitude of reciprocatory movement of the plunger and the cross-section area of said passageway when the valve member is in its open position.

2. The control valve, according to claim 1, wherein said valve member is a diaphragm.

3. The control valve according to claim 1, wherein said presettable plastic limit member is carried at the end of a rod threadedly received in said housing to preset the limit member by moving same towards or away from said plunger, said rod including a sealing ring between its outer surface and said housing.

4. The control valve according to claim 3, wherein said plastic limit member is in the form of a plastic disc removably attachable to the inner end of said rod.

5. The control valve according to claim 3,
wherein the outer end of said rod carries a rotatable handle externally of said housing, which handle may be rotated to preset the position of said limit member with respect to said plunger.

6. The control valve according to claim 3,
wherein said rod further includes a locking nut for locking said rod in its preset position.

7. The control valve according to claim 1, wherein said coiled spring encloses said one end of the plunger.

8. The control valve according to claim 1, wherein said spring biases said plunger to its extended position engaging said valve member, and said actuator actuates the plunger to its retracted position away from said valve member.

9. The control valve according to claim 8, wherein said actuator is a solenoid.

10. A control valve according to claim 1,
wherein said inlet port and outlet port are formed in a common wall in said housing, said valve member being movable away from said common wall to open said passageway, or against said common wall to close said passageway.

11. A control valve for controlling the flow of a fluid, comprising: a housing having an inlet port, an outlet port, and a passageway therebetween; and a valve assembly disposed within said housing and including a diaphragm movable to open and closed positions with respect to said passageway; said valve assembly further including a plunger reciprocatable within said housing to an extended position wherein one end of the plunger engages said diaphragm causing said diaphragm to close said passageway, or to a retracted position permitting said diaphragm to open said passageway; said control valve further including a coiled spring enclosing said plunger and having one end secured to said plunger, and the opposite end secured to said housing for urging said plunger to one of said positions; an actuator for actuating said plunger to the outer of said positions; and a presettable plastic limit member member presettable within said chamber to be engaged by the end of the plunger opposite to that engageable with the valve member to fix the retracted position of the plunger, and thereby to preset the magnitude of reciprocatory movement of the plunger and the cross-sectional area of said passageway when the diaphragm is in its open position.

12. The control valve according to claim 11, wherein said presettable plastic limit member is carried out at the end of a rod threadedly received in said housing to preset the limit member by moving same towards or away from said plunger, said rod including a sealing ring between its outer surface and said housing.

13. The control valve according to claim 12, wherein said plastic limit member is in the form of a plastic disc removably attachable to the inner end of said rod.

14. The control valve according to claim 12, wherein the outer end of said rod carries a rotatable handle externally of said housing, which handle may be rotated to preset the position of said limit member with respect to said plunger.

15. The control valve according to claim 12, wherein said coiled spring encloses said one end of the plunger.

16. A control valve for controlling the flow of a fluid, comprising: a housing having an inlet port, an outlet port, and a passageway therebetween; and a valve assembly disposed within said housing and including a valve member movable to open and closed positions with respect to said passageway; said valve assembly further including a plunger reciprocatable within said housing to an extended position wherein one end of the plunger engages said valve member causing said valve member to close said passageway, or to a retracted position permitting said valve member to open said passageway; said control valve further including a coiled spring enclosing said plunger, and having one end secured to said plunger and the opposite end secured to said housing for urging said plunger to one of said positions; an actuator for actuating said plunger to the other of said positions; and a presettable plastic limit member presettable within said housing to be engaged by the end of the plunger opposite to that engageable with the valve member to fix the retracted position of the plunger and thereby to preset the magnitude of reciprocatory movement of the plunger and the cross-sectional area of said passageway when the valve member is in its open position; said presettable plastic limit member being carried at the end of a rod threadedly received in said housing to preset the limit member by moving same towards or away from said plunger, said rod including a sealing ring between its outer surface and said housing.

17. The control valve, according to claim 16, wherein said valve member is a diaphragm.

18. The control valve according to claim 16, wherein said plastic limit member is in the form of a plastic disc removably attachable to the inner end of said rod.

19. The control valve according to claim 16, wherein said coiled spring encloses said one end of the plunger.

20. The control valve according to claim 16, wherein said actuator is a solenoid.

* * * * *